United States Patent [19]
Sonobe

[11] Patent Number: 5,889,966
[45] Date of Patent: Mar. 30, 1999

[54] DATA PROCESSOR HAVING BUS CONTROLLER FOR CONTROLLING A PLURALITY OF BUSES INDEPENDENTLY OF EACH OTHER

[75] Inventor: Satoru Sonobe, Tokyo, Japan

[73] Assignee: NEC Corporation, Tokyo, Japan

[21] Appl. No.: 679,128

[22] Filed: Jul. 12, 1996

[30] Foreign Application Priority Data

Jul. 13, 1995 [JP] Japan ................................. 7-177241

[51] Int. Cl.⁶ .................................................. G06F 13/36
[52] U.S. Cl. ...................... 395/287; 395/308; 395/309; 395/311; 395/290; 395/520; 395/840; 395/582
[58] Field of Search ...................... 395/306, 308, 395/309, 311, 281, 282, 284, 285, 287, 290, 391, 582, 840, 841, 847, 845, 856, 584, 586, 520; 711/115, 147, 150

[56] References Cited

U.S. PATENT DOCUMENTS

| | | | |
|---|---|---|---|
| 5,379,394 | 1/1995 | Goto | 711/100 |
| 5,428,746 | 6/1995 | Dalrymple | 395/821 |
| 5,481,679 | 1/1996 | Higaki et al. | 395/308 |
| 5,588,124 | 12/1996 | Hongo | 395/287 |
| 5,627,989 | 5/1997 | Nakamura et al. | 711/103 |
| 5,644,756 | 7/1997 | Harwood, III | 395/500 |
| 5,649,161 | 7/1997 | Andrade et al. | 711/167 |
| 5,774,684 | 6/1998 | Haines et al. | 395/309 |
| 5,790,884 | 8/1998 | Weinman et al. | 395/824 |

*Primary Examiner*—Meng-Ai T. An
*Assistant Examiner*—Raymond N. Phan
*Attorney, Agent, or Firm*—Foley & Lardner

[57] ABSTRACT

A data processor has a memory 100 for storing instructions being connected to a microcomputer 10 having a function of fetching an instruction from an external memory 100 via an external bus 95, a plurality of peripheral input/output circuits 40 via 49 incorporated in the microcomputer 10, and each of the peripheral input/output circuits 40 via 49 being interconnected by an incorporated peripheral bus 90, a bus controller 30 in the microcomputer 10 having both a bus state counter 31 for the external bus and a bus state counter 32 for the incorporated peripheral bus and independently controlling an external bus cycle using the external bus 95 and an incorporated peripheral bus cycle using the incorporated peripheral bus 90.

6 Claims, 11 Drawing Sheets

| STATE | FF1 | FF2 |
|-------|-----|-----|
| PT1   | 1   | 0   |
| PT2   | 0   | 1   |
| PT3   | 0   | 0   |

|  | BRANCH CYCLE | FETCH CYCLE | EXTERNAL MEMORY ACCESS CYCLE | NO BUS CYCLE |
|---|---|---|---|---|
| SBRSVF110 | 1 |  |  | 0 |
| FETSVF111 |  | 1 |  | 0 |
| MEMSVF112 |  |  | 1 | 0 |

| | BRANCH CYCLE | FETCH CYCLE | EXTERNAL MEMORY ACCESS CYCLE | NO BUS CYCLE | BUS HOLD |
|---|---|---|---|---|---|
| SBRSVF110 | 1 | | | 0 | 0 |
| FETSVF111 | | 1 | | 0 | 0 |
| MEMSVF112 | | | 1 | 0 | 0 |

|  | BRANCH CYCLE | FETCH CYCLE | EXTERNAL MEMORY ACCESS CYCLE | PERIPHERAL CIRCUIT ACCESS CYCLE | NO BUS CYCLE |
|---|---|---|---|---|---|
| SBRSVF110 | 1 |  |  |  | 0 |
| FETSVF111 |  | 1 |  |  | 0 |
| MEMSVF112 |  |  | 1 |  | 0 |
| IOMSVF113 |  |  |  | 1 | 0 |

FIG. 11 PRIOR ART

DATA PROCESSOR HAVING BUS CONTROLLER FOR CONTROLLING A PLURALITY OF BUSES INDEPENDENTLY OF EACH OTHER

BACKGROUND OF THE INVENTION

1. Field of the Invention

The present invention relates to a data processor and, more particularly, to a data processor having a bus controller for controlling a plurality of buses independently each other.

2. Description of the Related Art

Recently, a data processor having a central processing unit (CPU) and a plurality of peripheral input/output (I/O) circuits formed in one chip has been widely used in a microcomputer system. In this microcomputer system, a memory storing a string of instructions is provided outside the data processor as an external memory. The external memory and the internal peripheral I/O circuits are accessed by CPU to fetch instructions from the external memory and to read or write data from or into the I/O circuits. The peripheral I/O circuits serve as a pulse counter, a serial data receive/transmit circuit, and so on, and have respective registers each mapped at specific or unique addresses. The addresses of the external memory area and the the peripheral I/O circuits are discriminated on a memory map.

Figure 9:
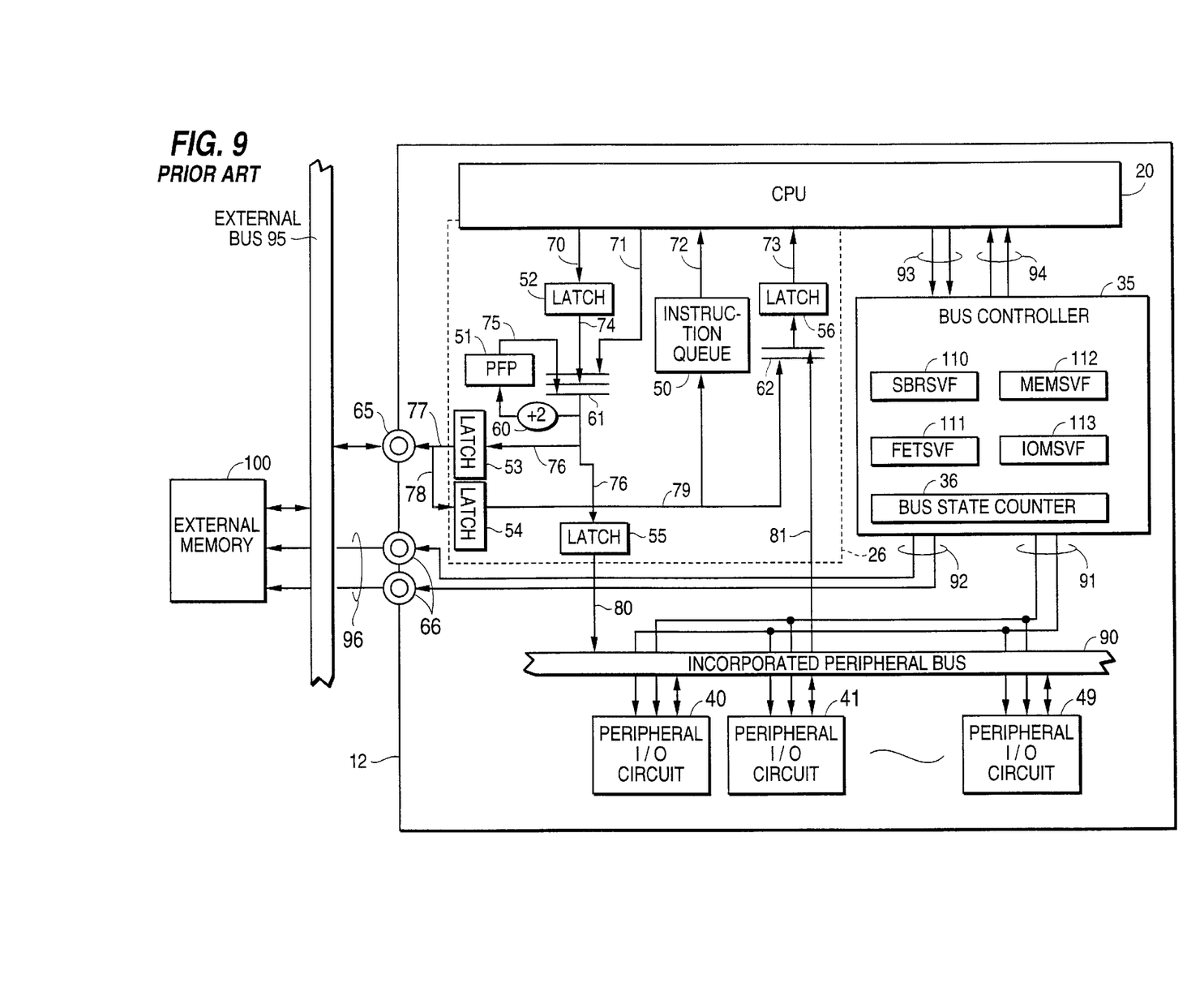
FIG. 9 is a block diagram showing a conventional data processor.

Referring now to FIG. 9, a microcomputer system according to the prior art includes a data processor or a microcomputer 12 and an external memory 100 which are interconnected through an external bus 95. The microcomputer 12 makes access to the external memory 100 by use of a group of external bus cycle control signals 96.

The microcomputer 12 comprises a CPU 20, a data path circuit 25, a bus controller 35, and peripheral I/O circuits 40–49. The CPU 20 outputs a set of request signals 93 to the bus controller 35 and receives a set of acknowledge signals 94 from the bus controller 35. The CPU 20 is further connected to the data path circuit 26 through an address bus 70, an data output bus 71, an instruction bus 72, and an data input bus 73. The CPU 20 outputs an address and write data to the data path circuit 25 and receives an instruction code and read data from the data path circuit 26.

The bus controller 35 has an internal bus state counter 36 and outputs a set of external bus control signals 92 to a set of terminals 66 and a set of internal peripheral bus control signals 91 to the peripheral circuits 40 through 49.

The data path circuit 26 is connected through buses 77 and 78 to a set of terminals 65 which are in turn coupled to the external bus 95. The data path circuit 26 is further connected to an internal or incorporated peripheral bus 90 through buses 80 and 81 to output an address and write data to the incorporated peripheral bus and receive read data. The peripheral circuits 40 through 49 are connected to the incorporated peripheral bus 90.

The data path circuit 26 is provided with an instruction queue 50 for storing several prefetched instructions, a prefetch pointer (PFP) 51 for storing prefetching addresses, latches 52 through 56 for latching address/data, and selectors 61 and 62. The latch 52 temporarily latches an address from the CPU 20. The selector 61 selects one of the output 74 of the latch 52, a prefetch address 75 of the prefetch pointer 51 and write data 71 from the CPU 20 outputs to the bus 71, and outputs the selected one to the bus 76 under the control of signals (not shown) from the bus controller 35.

An incrementer 60 outputs the address of the bus 76 incremented by 2 to the prefetch pointer 51. The prefetch pointer 51 memorizes the address from the incrementer 60 and outputs it to the selector 60 through the bus 75. The latch 53 memorizes the address and write data which are on the bus 76 and outputs them to the terminal group 65 through the bus 77. The latch 54 memorizes the read data which was input from the terminal group 65 through the bus 78, and outputs the read data to the instruction queue 50 and the selector 62 through the bus 79.

The instruction queue 50 memorizes the prefetched data on the bus 79 to a plurality of buffers and outputs the memorized data to the CPU 20 through the bus 72 as instruction data. The latch 55 memorizes the address and write data which are on the bus 76 and outputs them to the incorporated peripheral bus 90 through the bus 80. The selector 62 selects either the read data from the external memory on the bus 79 or the read data from the peripheral I/O on the bus 81 and outputs it to the latch 56 under the control of signals (not shown) from the bus controller 35. The latch 56 memorizes the read data from the selector 62 and outputs the read data to the CPU 20 through the bus 73.

Now, the operation of the bus controller 35 will be described.

The bus controller 35 starts the external bus cycle or the incorporated peripheral bus cycle in response to the request 93 from the CPU 20, such as a memory access request, a branch request, and a request to read a queue. The latches 52 through 56, the selectors 61 and 62, and the prefetch pointer 51 within the data path circuit 26 are controlled, and the acknowledge signal 94 is sent to the CPU 20 when the accessing operation is completed.

The bus controller 35 has an internal bus state counter 36, which counts the state of a bus.

Figure 10A:
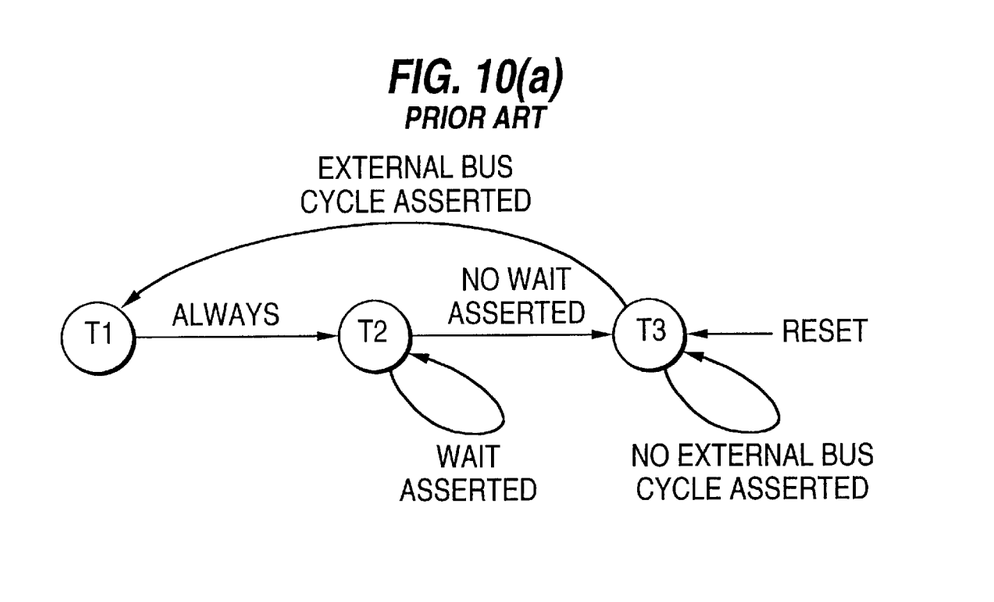
FIG. 10(a) is a state transition diagram of an external bus cycle in the conventional data processor.
Figure 10B:
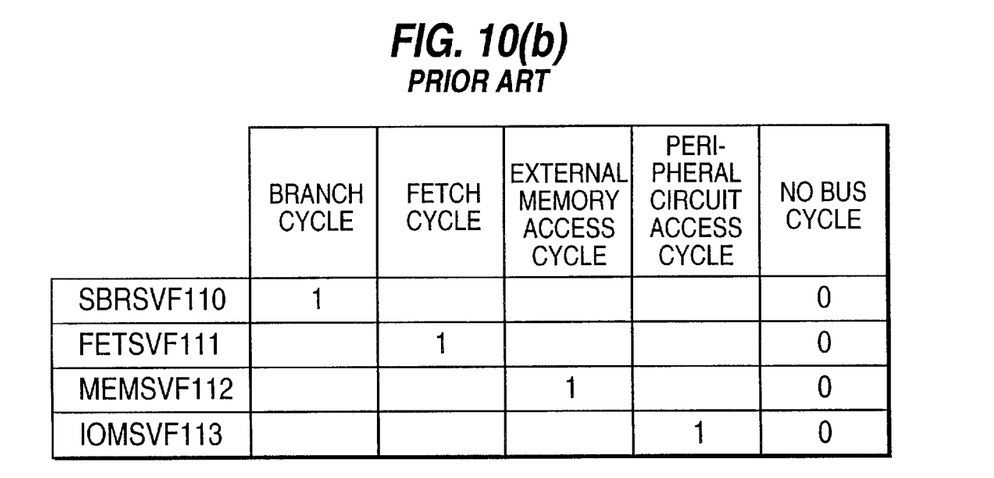
FIG. 10(b) is a state diagram of service flags for discriminating external bus cycles in the conventional data processor.

Referring to FIG. 10(a) which shows how the external bus cycle and the incorporated peripheral bus cycle make a transition and FIG. 10(b) which shows the state of a service flag for discriminating bus cycles, T1 represents a state where an address is output, T2 represents a state where data is output or input, and T3 represents the end state of a bus cycle or a state where a bus cycle has not been started. These states make a transition in synchronization with the system clock in the microcomputer 12.

The bus controller 35 has service flags SBRSVF 110, FETSVF 111, MEMSVF 112, and IOMSVF 113 in correspondence with the bus state counter 36 to be used for identification of bus cycle types. The SBRSVF 110 goes to a 1 when a branch cycle is executed, and the FETSVF 111 goes to a 1 when a fetch cycle is executed. The MEMSVF 112 goes to a 1 when an external memory access cycle is executed. The IOMSVF 113 goes to a 1 when a peripheral I/O access cycle is executed. When no bus cycle is started, all service flags 100 through 113 go to a 0. The SBRSVF 110, the FETSVF 111, and the MEMSVF 112 represent the bus cycles on the external bus 95, while the IOMSVF 113 represents the bus cycle on the incorporated peripheral bus 90.

First, in a reset state the bus state goes to T3. Until the request 93 from the CPU 20 becomes active, the bus state remains T3. When the request 93 is made active, the bus state makes a T3-to-T1 transition. A T1-to-T2 transition is made unconditionally. If a wait request is made in the state of T2, then the bus state will remain T2. If no wait request is made, a T2-to-T3 transition will be made.

Next, if the request 93 from the CPU 20 becomes active, the bus controller 35 will start a bus cycle. In a case where another bus cycle has already been started, the start of a new bus cycle is made to wait until the bus cycle being started ends.

When a bus cycle is started in response to the memory request 93 from the CPU 20, the bus controller 35 discriminates the external memory access and the peripheral I/O access in accordance with the address. In the case of the external memory access, MEMSVF 112 is set to a 1, and in the case of the peripheral I/O access, IOMSVF 113 is set to a 1.

The bus controller 35 also sets SBRSVF 110 to a 1 when a bus cycle is started in response to the branch request 93 from the CPU 20.

Incidentally, even when there is no request 93 from the CPU 20, the bus controller 35 starts an instruction fetch cycle which fetches an instruction from the external memory 100, as long as the buffer of the instruction queue 50 is not filled up. In this case, FETSVF 111 is set to a 1.

The bus controller 35 discriminates bus cycles, based on the values of the service flags 110 through 113, and in accordance with the kind of a bus cycle, the bus controller 35 controls the latches 52 through 56, the selectors 61 and 62, and the prefetch pointer 51 within the data path circuit 26.

Figure 11:
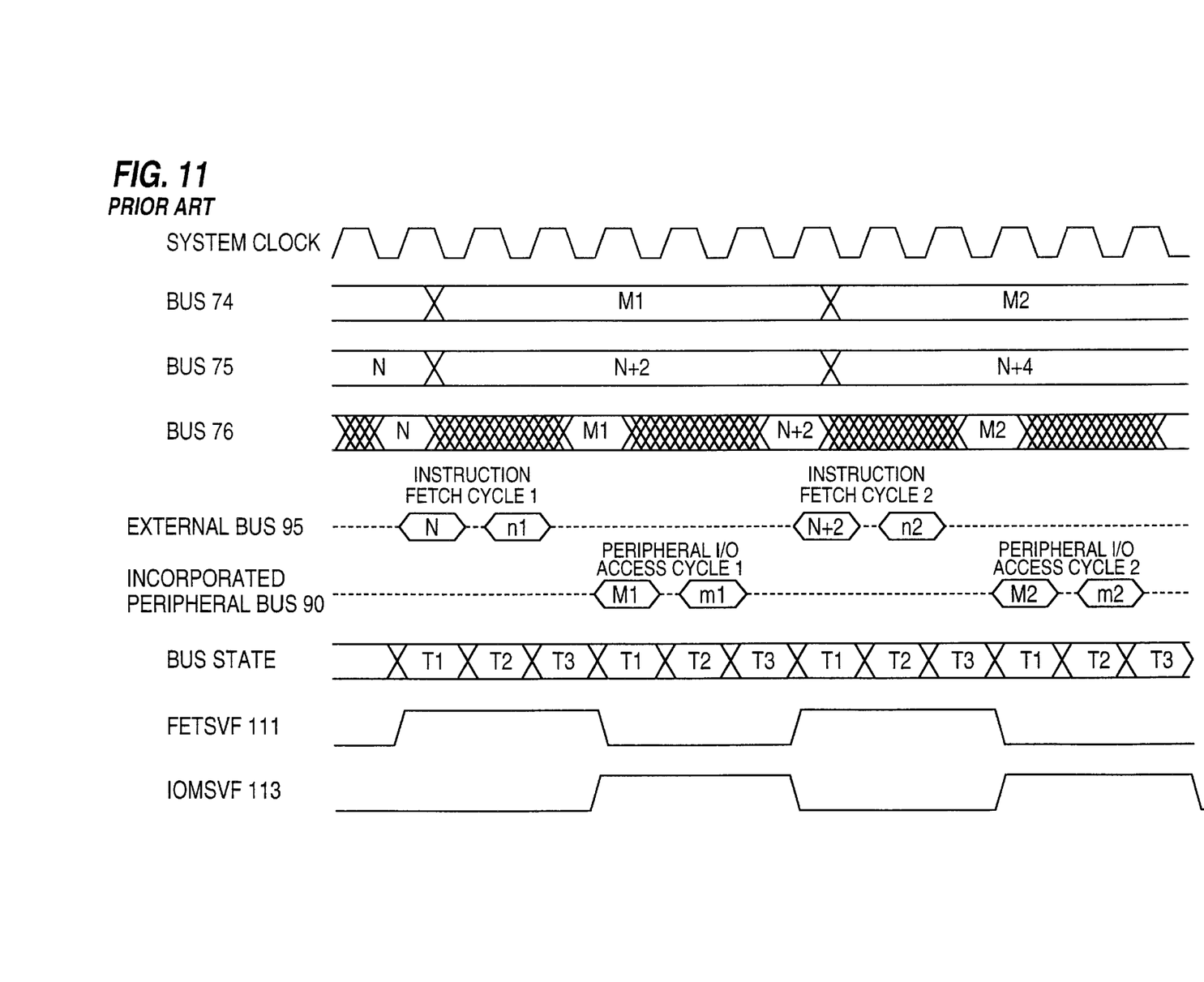
FIG. 11 is a timing diagram of the peripheral I/O access cycles in the conventional data processor.

Referring to FIG. 11 which is a timing diagram when the M1 and M2 addresses of the peripheral I/O circuit are accessed and read while fetching an instruction from the N address of the external memory, in this example all bus cycles are not waited.

When an instruction fetch cycle 1 is started, FETSVF 111 representative of a fetch cycle is set to a 1. In the T1 state, the selector 61 selects the bus 75 having the prefetched address N thereon, and the latch 53 fetches the address N and then outputs it to the external bus 95. The prefetch pointer 51 memorizes, at the timing of the end of the T1 state, the address N+2 incremented by+2 by the incrementer 60. In this example, fetching of instructions is performed at units of 2 bytes.

In the T2 state, the latch 54 latches the data n, transferred from the external memory 100 to the external bus 95, and then the data n is fetched into the instruction queue 50. An instruction code, stored in the instruction queue 50, is fetched by the CPU 20 according to the internal instruction process.

The T3 state is the end state of the bus cycle.

Assume now that the CPU 20 made a peripheral I/O circuit accessing request at T1 of the instruction fetch cycle 1. Because the bus controller 35 has priority of an external memory access cycle and a peripheral I/O access cycle over an instruction fetch cycle, the next bus cycle goes to the peripheral I/O access cycle. The bus controller 35 waits for the end of the instruction fetch cycle 1 and then resets FETSVF 111 to a 0 and sets IOMSVF 113 to a 1. The bus controller 35 also switches the control of the data path circuit 26 to a control for a peripheral I/O access cycle.

In the T1 state of the peripheral I/O access cycle, the selector 61 selects the bus 74 which has an address M1 to be accessed. The latch 55 fetches the address M1 and then outputs it to the incorporated peripheral bus 90. At this time, the prefetch pointer 51 does not update an address.

In the T2 state, the data m1, transferred from the peripheral I/O circuit to the incorporated bus 90, is fetched into the latch 56 through the bus 81 by controlling the selector 62. The data m1 fetched in the latch 56 is read in by the CPU 20.

The T3 state is the end state of a bus cycle. In this state, the bus controller 35 outputs the acknowledge 94, which indicates to the CPU 20 that the peripheral I/O access cycle has ended.

Since the peripheral I/O access cycle has ended, the cycle goes to an instruction fetch cycle again. When the instruction fetch cycle 2 is started, IOMSVF 113 is reset to a 0 and FETSVF 111 is set to a 1. Thereafter, as with the instruction fetch cycle 1, data n2 is read from the N+2 address of the memory 100 and is fetched into the instruction queue 50.

Assume now that, during the instruction fetch cycle 2, the CPU 20 again made a request to access the peripheral I/O circuit. The bus controller 35 again resets FETSVF 111 to a 0 and sets IOMSVF 113 to a 1, thereby starting the peripheral I/O access cycle 2. The bus controller 35, as with the peripheral I/O access cycle 1, switches control and reads data, m2, from the M2 address of the peripheral I/O circuit.

In the conventional data processor described above, the incorporated bus state counter 36 of the bus controller 33 comprises a single bus state counter. Therefore, when the external bus cycle and the incorporated peripheral bus cycle are both started, they are to be executed one by one. That is, both of them cannot be executed at the same time.

Therefore, the start of the peripheral I/O access cycle is made to wait until the instruction fetch cycle being started ends. In addition, because of the start of the peripheral I/O access cycle, the instruction fetch cycle was interrupted.

In a build-in data processor, particularly, in a case where a microcomputer is used of the Reduced Instruction Set Computer (hereinafter referred to a RISC) type where a load/store instruction is a basic instruction, sometimes the memory access instruction occupies, for example, 50% of all instructions and also 25% is occupied by the memory access with respect to the peripheral I/O circuit. In such a case, when an instruction of ¼, that is, 25% of all instructions is executed, the duty rate of the bus is reduced because both the external bus cycle and the incorporated peripheral bus cycle cannot be executed at the same time, resulting in a reduction in the processing ability of the system.

SUMMARY OF THE INVENTION

An object of the present invention is, therefore, to provide a data processor which is able to execute a fetch cycle and an incorporated peripheral bus cycle in parallel.

To achieve the above object, the data processor of the present invention comprises a central processing unit, a first bus connected to a first circuit, a second bus provided independently of the first bus and connected to a second circuit, and a bus controller for independently controlling the first and second buses by a first counter and a second counter, respectively, in accordance with the central processing unit, when the central processing unit sets the first counter, the first bus is occupied by the first circuit as a first cycle, and when the central processing unit sets the second counter, the second bus is occupied by the second circuit as a second cycle, and the second cycle executing in parallel with the first cycle.

Thus, the first cycle and the second cycle is executed in parallel. Therefore, a processing ability will be increased.

BRIEF DESCRIPTION OF THE DRAWINGS

The above and other objects, features and advantages of the present invention will be more apparent from the following description taken in conjunction with the accompanying drawings, in which.

DETAILED DESCRIPTION OF THE PREFERRED EMBODIMENTS

Figure 1:
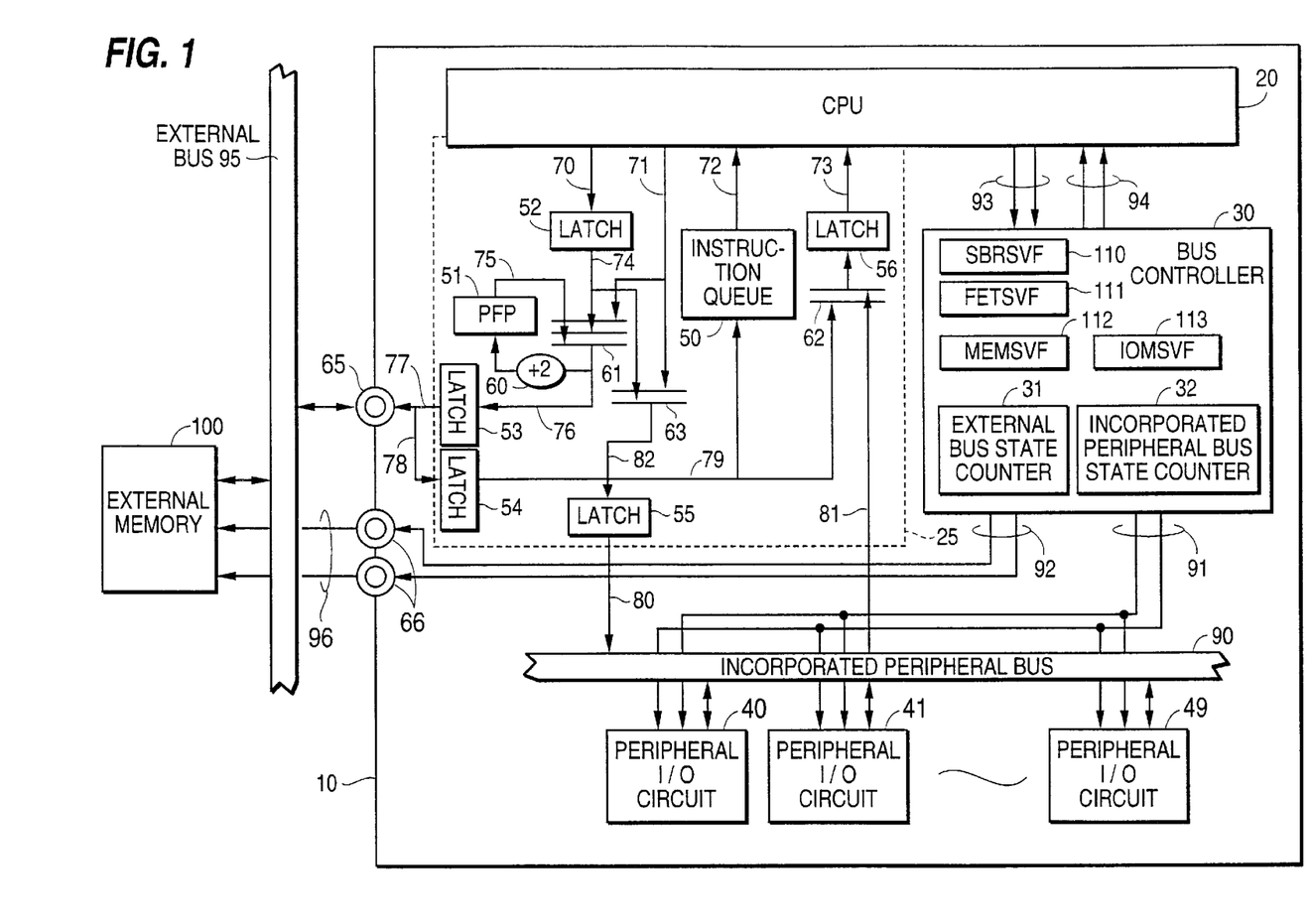
FIG. 1 is a block diagram showing a first embodiment of a data processor of the present invention.
Figure 2A:
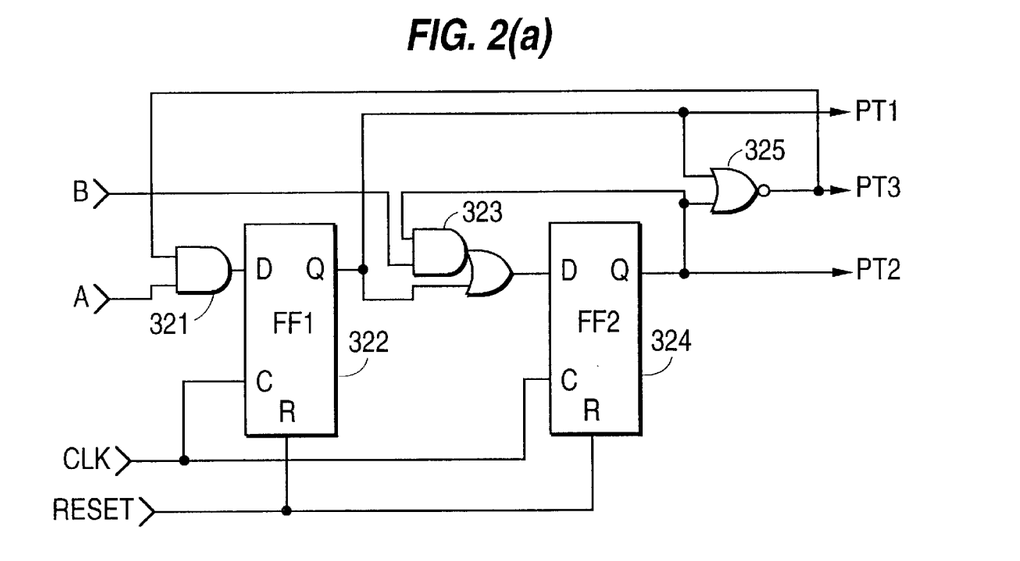
FIG. 2(a) is a circuit diagram showing a 2-bit counter for memorizing three states of the incorporated peripheral bus state counters in FIG. 1.
Figure 2B:
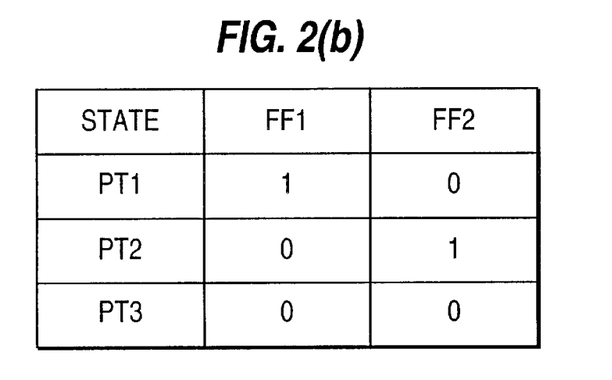
FIG. 2(b) is a diagram showing the three states of the 2-bit counter.

Referring now to FIGS. 1, 2(a) and 2(b), a microcomputer system according to the first embodiment of the present invention includes a data processor or a microcomputer 10 and a memory 100 which are interconnected through an external bus 95. The microcomputer 10 outputs a group of external bus cycle control signals 96 to the external memory 100.

The microcomputer 10 includes a CPU 20, a data path circuit 25, a bus controller 30, and peripheral circuits 40 through 49. The CPU 20 outputs a set of request signals 93 to the bus controller 30 and receives a set of acknowledge control signals 94 from the bus controller 30.

Also, the CPU 20 is connected to the data path circuit 25 through an address bus 70, an output data bus 71, an instruction bus 72, and an input data bus 73. The CPU 20 inputs an address and write data to the data path circuit 25 and receives an instruction code and read data from the data path circuit 25.

The bus controller 30 has an external bus state counter 31 and an incorporated peripheral bus state counter 32. The bus controller 30 outputs a group of external bus control signals 92 to a set of terminals 66 and outputs a set of incorporated peripheral bus control signals 91 to the peripheral circuits 40 through 49.

The data path circuit 25 is connected to a set of terminals 65 through buses 77 and 78, and outputs an address and write data to the outside and inputs read data. Similarly, the data path circuit 25 is connected to an incorporated peripheral bus 90 through buses 80 and 81, and outputs an address and write data to the incorporated peripheral bus and inputs read data.

The peripheral circuits 40 through 49 are each connected to the incorporated peripheral bus 90.

The data path circuit 25 is provided with an instruction queue 50 for storing prefetched instructions, a prefetch pointer (PFP) 51 for storing prefetched addresses, latches 52 through 56 for memorizing address/data, and selectors 61 through 63, these devices being connected to corresponding buses 70 through 82, respectively.

The latch 52 memorizes an address that the CPU 20 connects to the bus 70. The selector 61 selects one of an address 74 of the latch 52, a prefetch address 75 of the prefetch pointer 51 and write data 71 from the CPU 20, and outputs the selected one to the bus 76 under the control of signals (not shown) from the bus controller 30.

An incrementer 60 outputs the address of the bus 76 incremented by 2 to the prefetch pointer 51. The prefetch pointer 51 memorizes the address from the incrementer 60 and outputs it to the selector 61 through the bus 75.

The latch 53 memorizes the address and the write data which are on the bus 76 and outputs them to the terminal group 65 through the bus 77. The latch 54 memorizes the read data which was input from the terminal group 65 through the bus 78, and outputs the read data to the instruction queue 50 and the selector 62 through the bus 79.

The instruction queue 50 memorizes the prefetched data on the bus 79 to a plurality of buffers and outputs the memorized data to the CPU 20 through the bus 72 as instruction data. The selector 63 selects either the address 74 of the latch 52 or the write data 71 of the CPU 20 and outputs the selected address or write data to the bus 82 under the control of signals (not shown) from the bus controller 30.

The latch 55 memorizes the address and write data which are on the bus 82 and outputs them to the incorporated peripheral bus 90 through the bus 80. The selector 62 selects either the read data from the external memory on the bus 79 or the read data from the peripheral I/O on the bus 81 and outputs it to the latch 56. The latch 56 memorizes the read data from the selector 62 and outputs the read data to the CPU 20 through the bus 73.

The incorporated peripheral bus state counter 32 has a first flip-flop circuit (FF1) 322 and a second flip-flop circuit (FF2) 324. The first flip-flop circuit (FF1) 322 has a reset terminal R and reads the output data of an AND circuit 321 connected to a data input terminal D in synchronization with a clock signal CLK. Likewise, the second flip-flop circuit (FF2) 324 has a reset terminal R and reads the output data of an AND-OR circuit 323 connected to a data input terminal D in synchronization with the clock signal CLK. The output terminal Q of the first flip-flop circuit 322 is connected to the input terminal of the OR circuit of the AND-OR circuit 323 and also to one input terminal of a NOR circuit 325.

The output terminal, Q, of the flip-flop circuit 324 is connected to the other input terminal of the NOR circuit 325. The output terminal of the NOR circuit 325 is input to one input terminal of the AND circuit 321. On the other input terminal of the AND circuit 321, there is supplied a signal A, which goes to a high level when there is a factor which starts an incorporated peripheral bus cycle.

On the other input terminal of the AND circuit of the AND-OR circuit 323, there is supplied a signal B, which goes to a high level when the incorporated peripheral bus cycle is caused to be in a standby state.

The outputs of the flip-flop circuits 322 and 324 are taken to be set signals PT1 and PT2 for a peripheral circuit bus state, respectively, and the output of the NOR circuit 325 is taken to be a set signal PT3 for a peripheral circuit bus state.

A point differing from a conventional example is that, while the bus controller 35 of the conventional example has the bus state counter 36 which counts the number of cycles of both the external bus cycle and the incorporated peripheral bus cycle, in this embodiment the bus controller 30 consists of two counters, that is, the bus state counter 31 for an external bus and the bus state counter 32 for an incorporated peripheral bus cycle. With this, a 2-bit counter is added for memorizing 3 states.

In addition, the aforementioned selector 63 is added so that an instruction fetch cycle from an external memory and a peripheral I/O access cycle can be started at the same time. If the bit width of the incorporated peripheral bus 90 is taken to be 16 bits, 16 selectors will be added. On the other parts, no hardware is added.

Now, the operation of the bus controller 30 will be described.

The bus controller 30, as with the bus controller 30 of the conventional data processor, starts the external bus cycle or the incorporated peripheral bus cycle in response to the request 93 from the CPU 20, such as a memory access request, a branch request, and a request to read a queue. The latches 52 through 56, the selectors 61 through 63, and the prefetch pointer 51 within the data path circuit 26 are controlled, and the acknowledge signal 94 is sent to the CPU 20 when the accessing operation is completed.

The bus controller 30 has the external bus state counter 31 and the incorporated peripheral bus state counter 32 in the interior of the controller 30, which count the bus states of the external bus and the incorporated peripheral bus, respectively.

Therefore, again referring to FIGS. 2(a) and 2(b), a 2-bit counter for memorizing three states realizes an incorporated peripheral bus state transition diagram which will be described later. These three states consists of PT1, PT2, and PT3. The PT1 state is a state where the flip-flop FF1 is at a logic high level ("1") and the flip-flop FF2 is at a logic low level ("0"). The PT2 state is a state where the flip-flop FF1 is at a 0 and the flip-flop FF2 is at a 1. The PT3 state is a state where both the flip-flop FF1 and the flip-flop FF2 are at a 0.

These flip-flops FF1 and FF2 perform a data fetching operation at the timing when the system clock rises from a low level (0) to a high level (1).

First, the logic levels of the FF1 and FF2 go to a low level (0) when they are reset, and the state goes to the PT3 state. If a signal A, which goes to a high level (1) when there is a factor which starts the incorporated peripheral bus cycle, is supplied, then the level of the FF1 will go to a high level (1) and the level of the FF2 will go to a low level (0) and therefore the state will go to the PT1 state. Thereafter, the FF1 goes low (0) and the FF2 goes to high (1), and the state goes to the PT2 state.

During the time a signal B, which goes to high ("1") when a wait is put into the incorporated peripheral bus cycle is high ("1"), the PT2 state continues. If the signal B goes to low ("0"), both the FF1 and the FF2 will go to low ("0") and therefore the state will go to the PT3 state.

The PT1, PT2, and PT3 states are used for generating the incorporated peripheral bus control signal 91 and controlling the data bus 25.

Figure 3A:
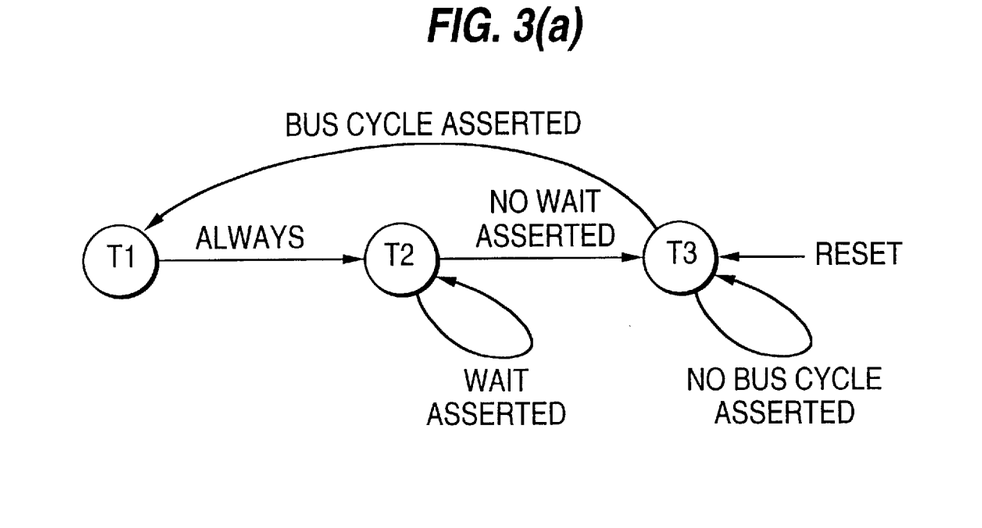
FIG. 3(a) is a state transition diagram of an external bus cycle.
Figure 3B:
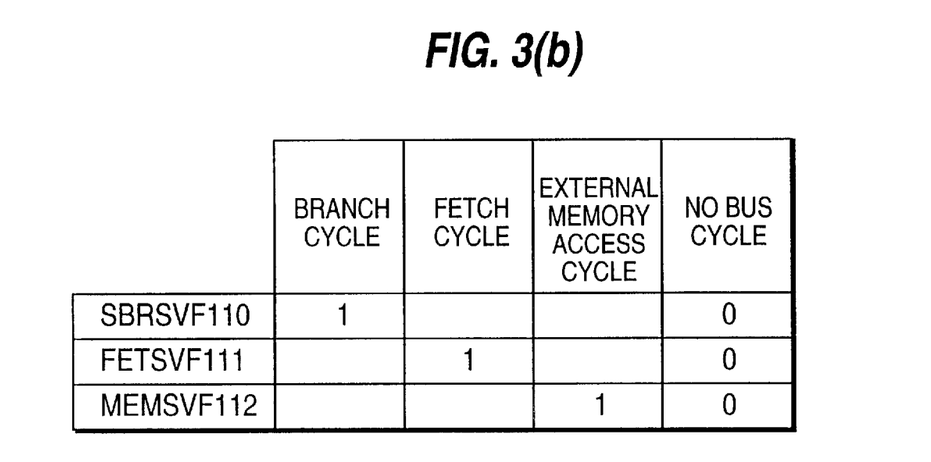
FIG. 3(b) is a state diagram of service flags for discriminating external bus cycles.
Figure 4A:
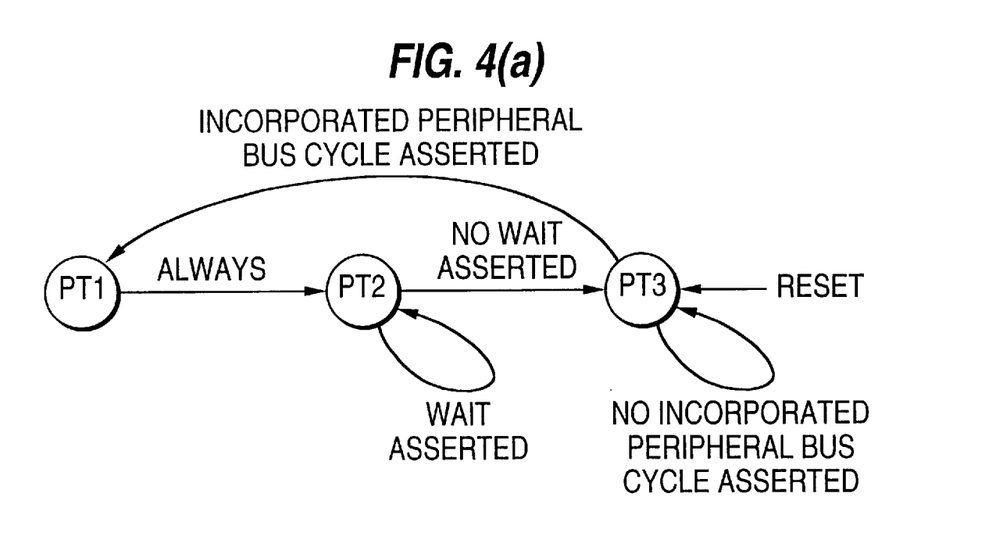
FIG. 4(a) is a state transition diagram of an incorporated peripheral bus cycle.
Figure 4B:
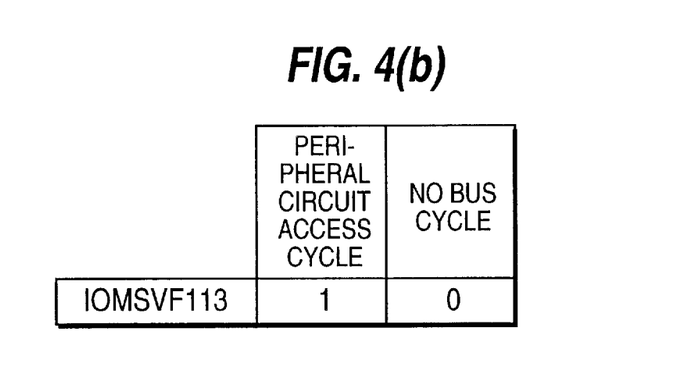
FIG. 4(b) is a state diagram of service flags for discriminating incorporated peripheral bus cycle.

Referring to FIG. 3(a) which shows a state transition diagram of the external bus cycle, FIG. 3(b) which shows a state diagram of service flags for discriminating external bus cycles, FIG. 4(a) which shows a state transition diagram of the incorporated peripheral bus cycle, and FIG. 4(b) which shows a state diagram of service flags for judging the kind of that state, T1 represents a state where an address is output to an external bus, T2 represents a state where data is output to or input from the external bus, and T3 represents the end state of the external bus cycle or a state where the external bus cycle has not been started.

Similarly, PT1 is a state where an address is output to the incorporated peripheral bus. PT2 is a state where data is output to or input from the incorporated peripheral bus. PT3 is the end state of the incorporated peripheral bus cycle or a state where the incorporated peripheral bus cycle has not been started. These states make a transition in synchronization with the system clock in the microcomputer 10.

The bus controller 30 has service flags 110 through 112 in correspondence with the external bus state counter 31. The service flags are used for discriminating external bus cycles. When a branch cycle is executed, SBRSVF 110 goes to a 1. When a fetch cycle is executed, FETSVF 111 goes to a 1. When an external memory access cycle is executed, MEMSVF 112 goes to a 1. When no external bus cycle is started, all service flags 100 through 112 go to a 0.

The bus controller 30 further has a service flag 113 in correspondence with the incorporated peripheral bus state counter 32. The service flag is used for discriminating the state of the incorporated peripheral bus cycle. When a peripheral I/O access cycle is executed, IOMSVF 113 goes to a 1. When the peripheral I/O access cycle is not started, IOMSVF 113 goes to a 0.

First, in a reset state the external bus state and the incorporated peripheral bus state go to T3 and PT3 states, respectively. Until the request 93 from the CPU 20 becomes active, the bus state remains unchanged. When the request 93 from the CPU 20 is made active, the bus controller 30 starts a bus cycle. In a case where another bus cycle has already been started, the start of a new bus cycle is made to wait until the bus cycle being started ends.

As described above, the external memory area and the peripheral I/O area have been discriminated with a memory map, and when data is accessed, the bus controller 30 judges whether an object of access is an external memory or a 33 peripheral I/O in accordance with an address. Therefore, when a bus cycle is started in response to the memory request 93 from the CPU 20, the bus controller 30 discriminates the external memory access and the peripheral I/O access in accordance with the address. In the case of the external memory access, MEMSVF 112 is set to a 1, and the external bus state makes a transition to the T1 state. In the case of the peripheral I/O access, IOMSVF 113 is set to a 1. The incorporated peripheral bus state makes a transition to the PT1 state.

The external bus state unconditionally makes a transition from the T1 state to the T2 state. If a wait request with respect to the external bus state is made in the state of T2, then the external bus state will remain T2. If there is no wait request, the external bus state will make a transition to the T3 state.

The PT1-to-PT2 transition of the incorporated peripheral bus state is always made unconditionally. If a wait request with respect to the incorporated peripheral bus state is made in the state of PT2, then the incorporated peripheral bus state will remain PT2. If there is no wait request, the incorporated peripheral bus state will make a transition to the PT3 state and go to a standby state.

Also, when a bus cycle is started in response to the branch request 93 from the CPU 20, the bus controller 30 sets SBRSVF 110 to a high level ("1") and the external bus state makes a transition to the T1 state.

Incidentally, even when there is no request 93 from the CPU 20, the bus controller 30 starts an instruction fetch cycle which fetches an instruction from the external memory 100, as long as the buffer of the instruction queue 50 is not filled up. In this case, FETSVF 111 is set to a 1 and the external bus state makes a transition to the T1 state.

The bus controller 30 discriminates bus cycles, based on the values of the service flags 110 through 113, and in accordance with the kind of a bus cycle, the bus controller 30 controls the latches 52 through 56, selectors 61 through 63, and prefetch pointer 51 within the data path circuit 25.

Figure 5:
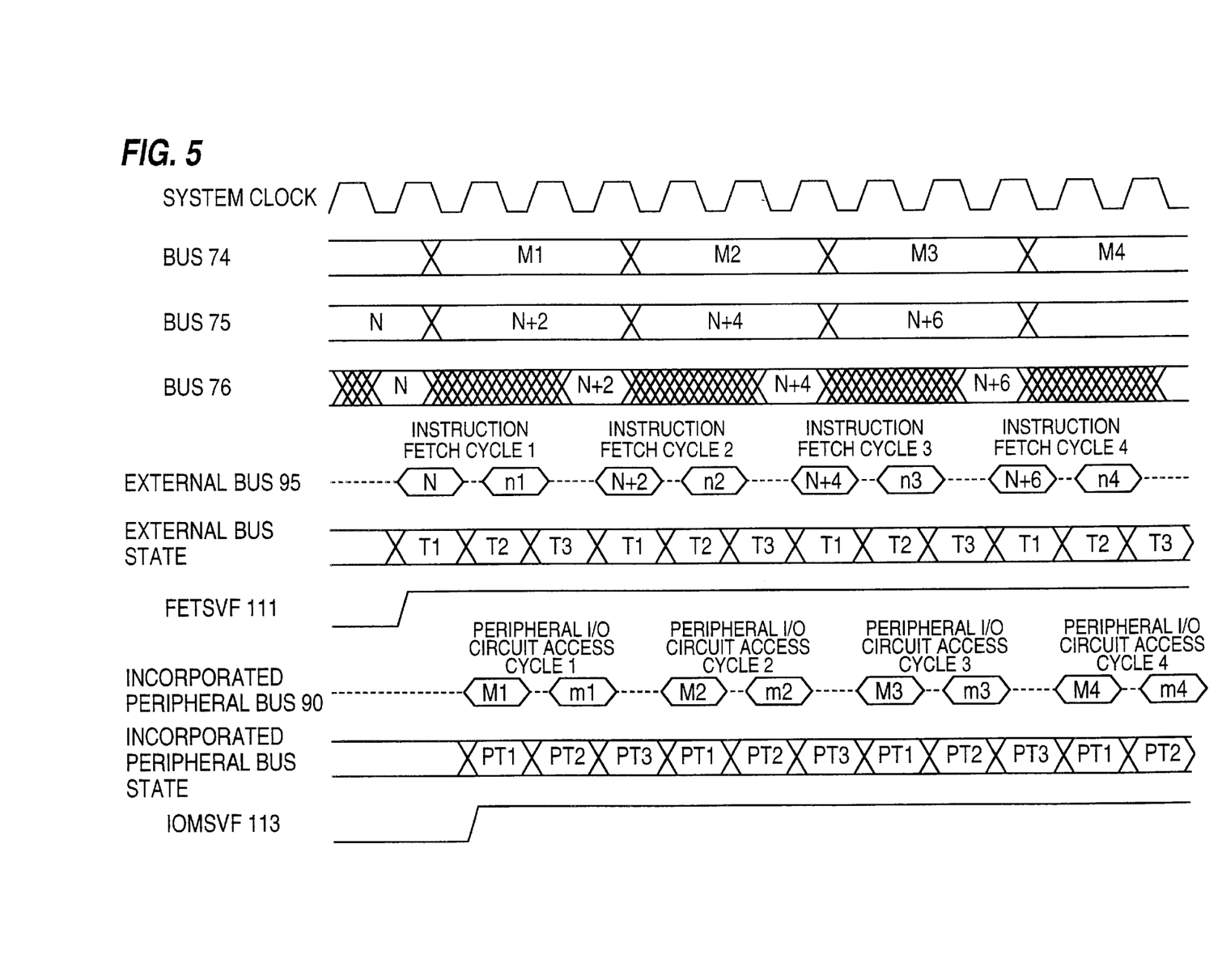
FIG. 5 is a timing diagram of the peripheral I/O access cycles in the first embodiment.

FIG. 5 is a timing diagram when the M1, M2, M3 and M4 addresses of the peripheral I/O are accessed and read while fetching an instruction from the N address of the external memory. In this example, all bus cycles are not waited.

When an instruction fetch cycle 1 is started, the bus controller 30 sets FETSVF 1 representative of a fetch cycle to a 1. In the T1 state, the selector 61 selects the bus 75 having the prefetched address N thereon, and the latch 53 fetches the address N and then outputs it to the external bus 95.

The prefetch pointer 51 memorizes the address N+2 33 incremented by+2 by the incrementer 60. In this example, fetching of instructions is performed at units of 2 bytes.

In the T2 state, the latch 54 latches the data n, transferred from the external memory 100 to the external bus 95, and then the data n is fetched into the instruction queue 50. An instruction code, stored in the instruction queue 50, is fetched by the CPU 20 according to the internal instruction process.

The T3 state is the end state of the bus cycle.

Assume now that the CPU 20 made a peripheral I/O accessing request at T1 of the instruction fetch cycle 1. Because no bus cycle has been started on the peripheral bus 90, the bus controller 30 sets IOMSVF 113 to a 1 and immediately starts a peripheral I/O access cycle.

In the PT1 state of the peripheral I/O access cycle, the selector 63 selects the bus 74 having an access address M1 thereon. The latch 55 fetches the address M1 and then outputs it to the incorporated peripheral bus 90. When this occurs, the instruction fetch cycle and the peripheral I/O cycle can be started at the same time because the latches 52 through 54 being used in the instruction fetch cycle from the external memory do not participate in the selector 61.

In the T2 state, the data m1, transferred from the peripheral I/O to the incorporated bus 90, is fetched into the latch 56 through the bus 81 by controlling the selector 62. The data m1 fetched in the latch 56 is read in by the CPU 20.

The PT3 state is the end state of a bus cycle. In this state, the bus controller 35 outputs the acknowledge signal 94, which indicates to the CPU 20 that a memory access cycle has ended.

On the other hand, assume that, during the start of the peripheral I/O access cycle 1, the CPU 20 made a request to access the next peripheral I/O. The bus controller 30 waits for the peripheral I/O access cycle 1 to end and then start the peripheral I/O access cycle 2. Thereafter, peripheral I/O access cycles 3 and 4 are consecutively started in response to requests to access a peripheral I/O.

Thus, by adding a 2-bit counter and 16 selectors and independently controlling the external bus cycle and the incorporated peripheral bus cycle, both the instruction fetch cycle from the external memory and the peripheral I/O memory access cycle can be started in parallel.

Figure 6:
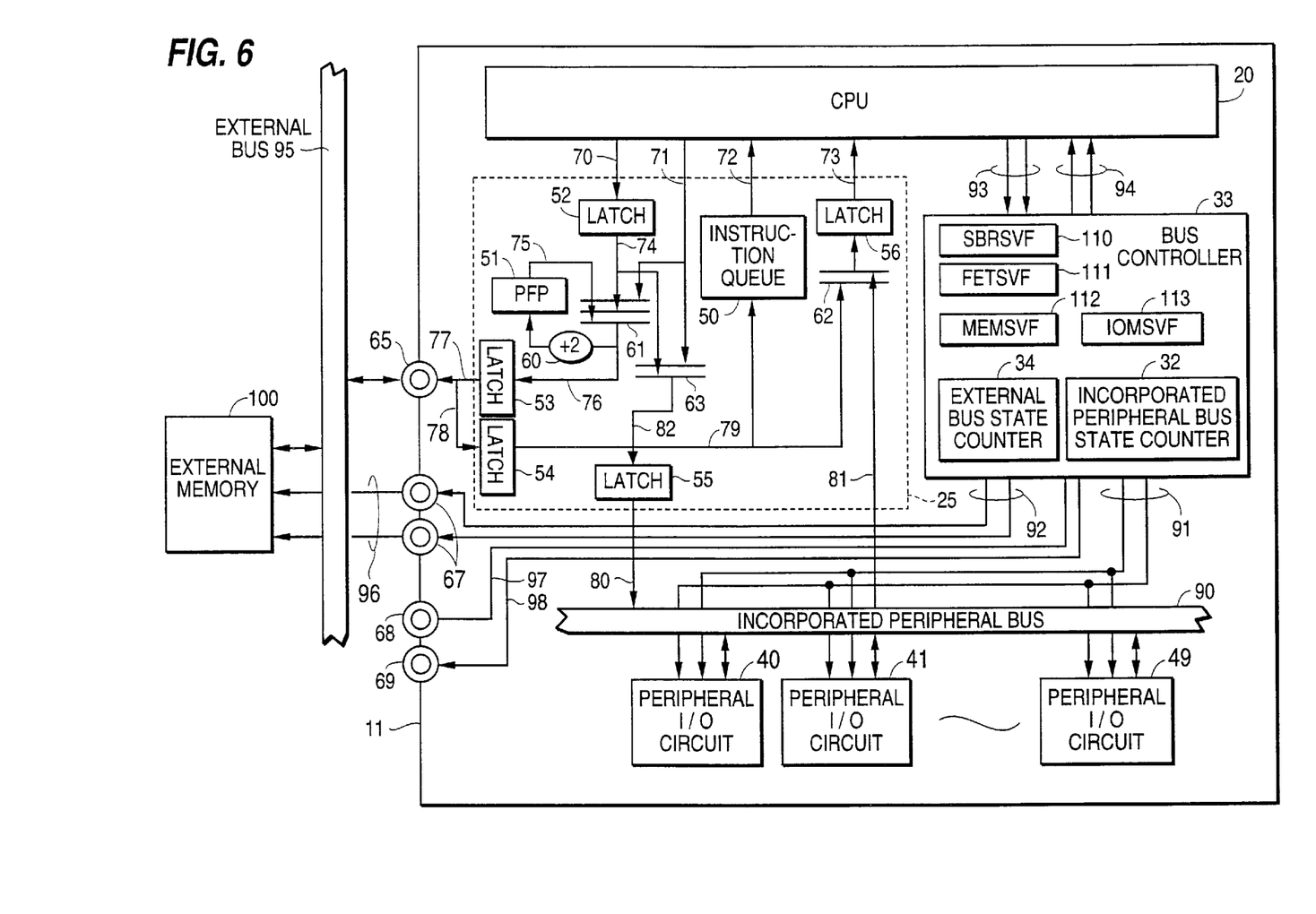
FIG. 6 is a block diagram showing a second embodiment of the data processor of the present invention.

Now, a second embodiment of the present invention will be described in reference to FIG. 6. The point differing from the first embodiment of the present invention is that a microcomputer 11 has a bus hold function. The bus holding here means that, with respect to a bus hold request (active low) from an inverting HLDRQ terminal 68, the microcomputer 11 sets the signals from terminals 65 and 67 to a high impedance level to open an external bus 95. During this, an inverting HLDAK terminal 69 is made active ("0") to inform outside of the bus holding being received.

More specifically, a bus controller 33 receives a bus hold request signal 97 from the inverting HLDRQ terminal 68 and then outputs a bus hold acknowledge signal 98 to the inverting HLDAK terminal 69. In addition, an external bus state counter 34 can make a transition to a bus hold state.

The other constitutions are the same as the first embodiment and therefore a description thereof is omitted.

Figure 7A:
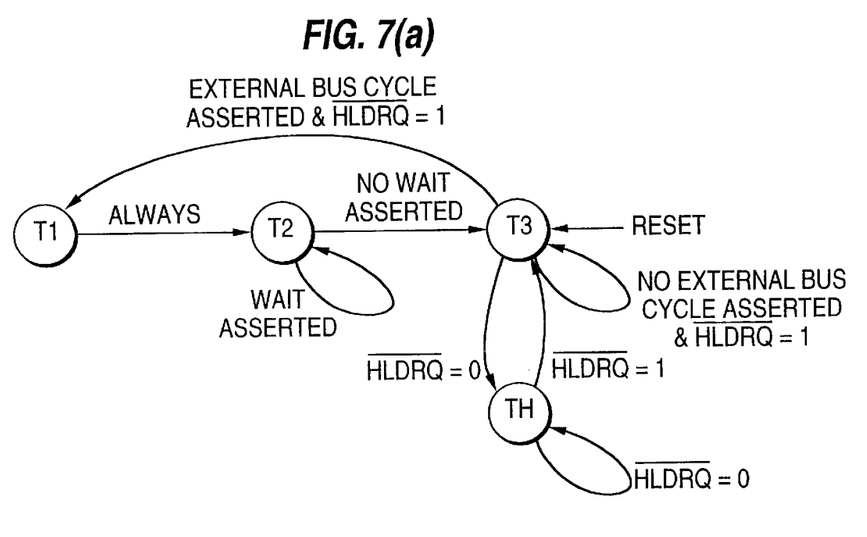
FIG. 7(a) is a state transition diagram of an external bus cycle corresponding to bus holding.
Figure 7B:
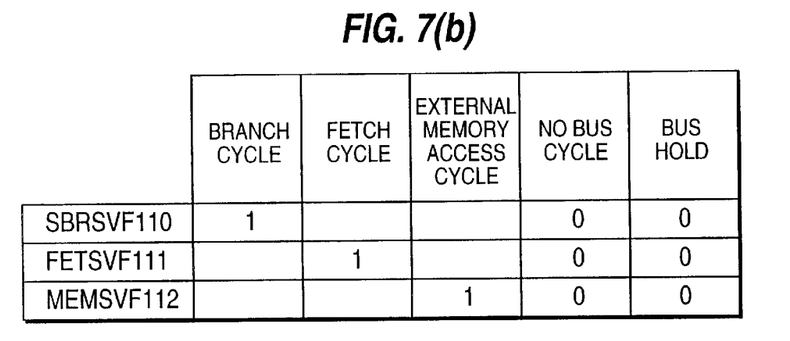
FIG. 7(b) is a state diagram of service flags for discriminating external bus cycles.

Referring to FIG. 7(a) which shows a state transition diagram of the external bus cycle corresponding to bus holding and FIG. 7(b) which shows a state diagram of service flags for discriminating the external bus cycle, T1 represents a state where an address is output to an external bus, T2 represents a state where data is output to or input from the external bus, TH represents a bus holding state, and T3 represents the end state of the external bus cycle or a state where the external bus cycle has not been started.

Also, the state transition of the incorporated peripheral bus cycle is the same as FIGS. 4(a) and 4(b) used in the first embodiment. Therefore, PT1 is a state where an address is output to the incorporated peripheral bus. PT2 is a state where data is output to or input from the incorporated peripheral bus. PT3 is the end state of the incorporated peripheral bus cycle. These states also make a transition in synchronization with the system clock in the microcomputer 11.

The bus controller 33 has service flags, SBRSVF 110, FETSVF 111, and MEMSVF 112, in correspondence with an external bus state counter 34. The service flags are used for discriminating external bus cycles. When a branch cycle is executed, SBRSVF 110 goes to a 1. When a fetch cycle is executed, FETSVF 111 goes to a 1. When an external memory access cycle is executed, MEMSVF 112 goes to a 1. When no external bus cycle is started, all service flags 100 through 112 go to a 0.

The bus controller 33 further has a service flag IOMSVF 113 in correspondence with an incorporated peripheral bus state counter 35. The service flag is used for discriminating the state of the incorporated peripheral bus cycle. That is, when a peripheral I/O access cycle is executed, IOMSVF 113 goes to a 1. When the peripheral I/O access cycle is not started, IOMSVF 113 goes to a 0.

Figure 8:
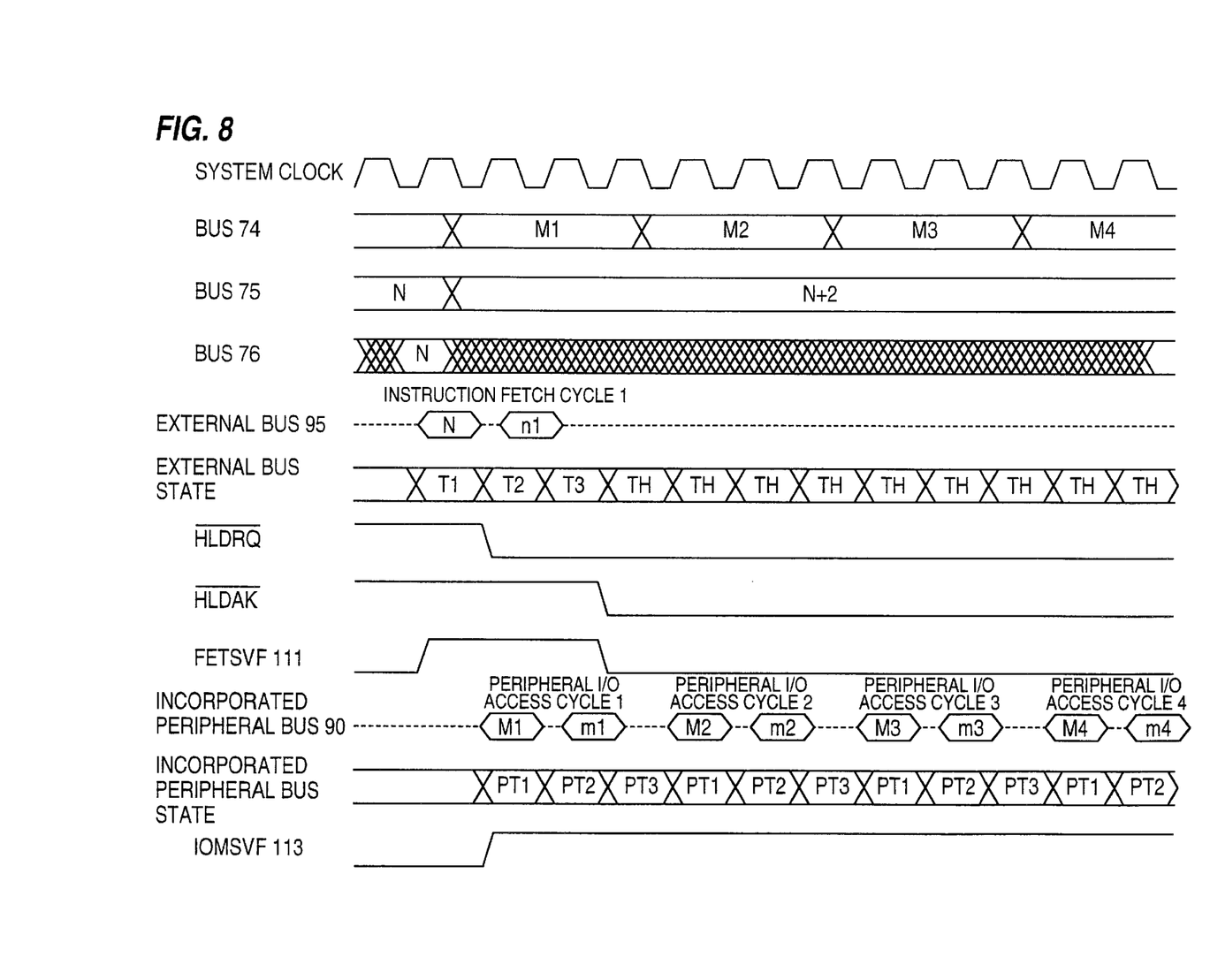
FIG. 8 is a timing diagram of the peripheral I/O access cycles in the second embodiment.

Referring to FIG. 8 which shows a timing diagram when the M1, M2, M3, and M4 addresses of the peripheral I/O are accessed and read, all bus cycles have no wait in the bus hold state.

The operation will be described. First, in a reset state the external bus state and the incorporated peripheral bus state go to T3 and PT3 states, respectively. When a request from the CPU 20 becomes active, the bus controller 33 starts a bus cycle. In a case where another bus cycle has already been started at the same bus, the start of a new bus cycle is made to wait until the bus cycle being started ends.

When a bus cycle is started in response to the memory memory request 93 from the CPU 20, the bus controller 33 discriminates the external memory access and the peripheral I/O access in accordance with the address specified by the memory request 93.

In the case of the external memory access, the service flag MEMSVF 112 is set to a 1 and the external bus state makes a transition to the T1 state. In the case of the peripheral I/O access, the service flag IOMSVF 113 is set to a 1 and the incorporated peripheral bus state makes a transition to the PT1 state.

The T1-to-T2 transition of the external bus state and the PT1-to-PT2 transition of the incorporated peripheral bus state are made unconditionally. If the external bus state cycle makes a wait request in the T2 state, then the 33 external bus state will remain T2. If there is no wait request, the external bus state and the incorporated peripheral bus state will make a transition to the T3 and PT3 states, respectively.

When the request 93 from the CPU 20 is a branch request, the bus controller 33 sets the service flag SBRSVF 110 to a 1. Even when there is no request 93 from the CPU 20, the bus controller 30 starts the instruction fetch cycle which fetches an instruction from the external memory 100, as long as the buffer of the instruction queue 50 is not filled up. In this case, FETSVF 111 is set to a 1 and the external bus state makes a transition to the T1 state. The transitions thereafter are the same as the aforementioned transitions.

Referring to FIG. 8 which shows a timing diagram when the M1, M2, M3, and M4 addresses of the peripheral I/O are accessed and read, all bus cycles have no wait in the bus hold state. Because an inverting HLDRQ terminal 68 becomes active ("0") at the T2 state of the instruction fetch cycle 1, the external bus state counter 34 makes a transition to a TH state after completion of the instruction fetch cycle 1.

An inverting HLDAK terminal 69 is made active ("0") so that the outputs of the signals from the terminals 65 and 67 go to a high impedance level.

Assume now that the CPU 20 made a request to access the peripheral I/O at the T1 state of the instruction fetch cycle 1. The bus controller 33 sets the service flag IOMSVF 113 to a 1 and immediately starts the peripheral I/O access cycle.

Thereafter, during the time the service flag IOMSVF 113 holds a 1 in response to the peripheral I/O access, peripheral I/O access cycles 2 through 4 are consecutively started.

If the external bus cycle and the incorporated peripheral bus cycle are counted by a single bus state counter, as in the conventional data processor, then it will become impossible to start the peripheral I/O access cycle during the bus hold state. However, when two state counters, that is, the external bus state counter 34 and the incorporated peripheral bus state counter 32, are provided as in the second embodiment, both the instruction fetch cycle and the peripheral I/O memory access cycle can be started at the same time even during bus holding.

As has been described hereinbefore, instead of the conventional data path circuit means, the data processor of the present invention uses data path circuit means further provided with 16 selectors as selection means which selects either the memory address or the write data, output by the central arithmetic processing means, and which outputs the selected address or data to a plurality of peripheral circuits. Instead of the conventional bus controller, the data processor of the present invention also uses a second bus controller which has a 2-bit counter as an external bus state counter for counting the number of states of a bus cycle of said external bus and an incorporated peripheral bus state counter for counting the number of states of a bus cycle of said incorporated peripheral bus. The data processor of the present invention further has bus cycle parallel control means which parallel starts both an instruction fetch cycle of the external memory based on a result of the count of the external bus state counter and a data access cycle of the peripheral circuit based on a result of the count of the incorporated peripheral bus state counter. Consequently, the memory access of the peripheral I/O can be executed without interrupting the fetching of an instruction from the external memory.

TABLE 1

| All instructions 50% | |
| --- | --- |
| Memory access instruction 50% | |
| External access Instruction 25% | Word 12.5% Half word or byte 12.5% |
| Peripheral I/O access 25% | Half word or byte 25% |
| Other instructions 50% | |

For example, as a build-in data processor, a description will be made of a CPU based on the RISC (Reduced Instruction Set Computer) type where a load/store instruction is a basic instruction. As shown in Table 1, a memory access instruction occupies about 50% of all instructions. The memory access instruction consists of an external memory access instruction of 25% and an peripheral I/O access instruction of 25%. The external memory access instruction consists of a word access instruction of 12.5% and a half word access instruction of 12.5%. The peripheral I/O access instruction consists of a half word or byte access instruction of 25%.

The widths of the external bus and the incorporated peripheral bus are taken to be 16 bits. The average instruction length is 2.5 bytes and all access operations have no wait.

TABLE 2

| | Conventional data processor | Present invention |
| --- | --- | --- |
| Instructions other than a memory access | (clock) (rate) 7.5 × 50/100 = 3.75 | 3.75 |
| Word access to an external memory | (7.5 + 6) × 12.5/100 = 1.6875 | 1.6875 |
| Half word or byte access to an external memory | (7.5 + 3) × 12.5/100 = 1.3125 | 1.3125 |
| Peripheral I/O access | (7.5 + 3) × 25/100 = 2.625 | 7.5 × 25/100 = 1.875 |
| Total lock/Instruction | 9.375 | 8.625 |

Referring to Table 2, the conventional data processor requires 9.375 clock/instruction in total because the instructions other than the memory access instruction need 3.5 clocks, the external memory word access 1.6875 clocks, the external memory half word/byte access 1.1325 clocks, and the peripheral I/O access 2.625 clocks.

On the other hand, in the data processor of the present invention, execution of the peripheral I/O access instruction needs only 7.5 clocks that instruction fetching needs, because the peripheral I/O access can be executed in parallel with the instruction fetching, and 8.625 clock/instruction is required in total.

Therefore, if the processing ability of a system is measured with the number of clocks which one instruction needs, the system processing ability will be increased by about 8% by adding minimum hardware in accordance with the present invention, so practical effects are extremely high.

What is claimed is:

1. A data processor comprising:

a central processing unit;

first and second buses provided independently of each other;

a data path control circuit connected to said central processing unit, said first bus and said second bus;

a memory connected to said first bus and storing a string of instructions; and a first peripheral circuit connected to said second bus and said data path control circuit;

said data path control circuit responding to a request from said central processing unit to perform a data transfer between said central processing unit and said first peripheral circuit by use of said second bus while performing an instruction prefetch operation in which an instruction stored in said memory is read out therefrom and fetched in said data path control circuit by use of said first bus, wherein said data path control circuit includes bus controller for detecting a status of each of said first bus and said second bus by use of a first counter and a second counter, respectively, said bus controller performing said instruction prefetch operation when said first counter indicates an instruction fetch cycle and performs said data transfer when said second counter indicates an input/output cycle.

2. The data processor as claimed in claim 1, wherein said second bus, said central processing unit and said data path control circuit are formed on a single semiconductor chip, and said first bus and said memory are provided outside said single semiconductor chip.

3. A data processor comprising:

a central processing unit;

first and second buses provided independently of each other;

a data path control circuit connected to said central processing unit, said first bus and said second bus;

a memory connected to said first bus and storing a string of instructions; and a first peripheral circuit connected to said second bus and said data path control circuit;

said data path control circuit responding to a request from said central processing unit to perform a data transfer between said central processing unit and said first peripheral circuit by use of said second bus while performing an instruction prefetch operation in which an instruction stored in said memory is read out therefrom and fetched in said data path control circuit by use of said first bus, wherein said data path control circuit comprises:

a prefetch pointer for storing a fetch address for fetching data from said memory;

a first latch for storing an address output from said central processing unit;

a first selector for selecting one from among an address output from said first latch, an address output from said prefetch pointer, and write data output from said central processing unit;

an incrementer for incrementing an address output from said first selector and outputting the incremented address to said prefetch pointer;

a second latch for storing an address and write data which are output from said first selector and outputting them to said first bus;

a third latch for storing read data read out from said memory via said first bus;

a second selector for selecting either said read data output from said third latch or said read data from said first circuit;

a fourth latch for storing data output from said second selector and outputting said data to said central processing unit;

a third selector for selecting either an address output from said first latch or write data output from said central processing unit; and a fifth latch for storing an address and write data output from said third selector and outputting them to said second bus;

said first selector selecting said prefetch pointer for making said fetch address and said third selector selecting said address and data for said first peripheral circuit in parallel when both said fetching cycle and said input/output cycle are requested.

4. A data processor including an incorporated microcomputer which performs an input/output operation via an incorporated peripheral bus in a incorporated peripheral bus cycle, while a central processing unit is fetching an instruction from said external memory via an external bus in a fetch cycle, comprising:

first data path means for receiving an address and data from said central processing unit, and for outputting an address and write data from said central processing unit to said external memory when said fetch cycle is requested;

second data path means provided independently of said first data path means for receiving said address and data from said central processing unit and for outputting said address and data to said input/output circuit when said incorporated peripheral bus cycle is requested; and a bus controller which has an external bus state counter for counting the number of states of said fetch cycle and an incorporated peripheral bus state counter for counting the number of states of said incorporated peripheral bus cycle, and said bus controller which starts in parallel both an instruction fetch cycle of said external memory based on a result of a count of said external bus state counter and a data access cycle of said input/output operation based on a result of a count of said incorporated peripheral bus state counter, wherein said first data path means includes:

a prefetch pointer for storing a fetch address for fetching data from said external memory;

a first latch for storing an address output from said central processing unit;

a first selector for selecting one from among an address output from said first latch, an address output from said prefetch pointer, and write data output from said central processing unit;

an incrementer for incrementing an address output from said first selector and outputting the incremented address to said prefetch pointer; and a second latch for storing an address and write data that are output from said first selector and outputting them to said external bus.

5. The data processor as claimed in claim 4, wherein said second data path means includes second selector for selecting either said address output form said first latch or said write data output from said central processing unit; and a third latch for storing said address and write data output from said second selector and outputting them to said incorporated peripheral bus;

said first selector selecting said prephetch pointer and said second selector selecting said address and write data for peripheral input/output circuit in parallel when both said fetch cycle and said incorporated peripheral bus cycle are requested.

6. A data processor including an incorporated microcomputer which performs an input/output operation via an incorporated peripheral bus in a incorporated peripheral bus cycle, while a central processing unit is fetching an instruction from said external memory via an external bus in a fetch cycle, comprising:

first data path means for receiving an address and data from said central processing unit, and for outputting an address and write data from said central processing unit to said external memory when said fetch cycle is requested;

second data path means provided independently of said first data path means for receiving said address and data from said central processing unit and for outputting said address and data to said input/output circuit when said incorporated peripheral bus cycle is requested; and a bus controller which has an external bus state counter for counting the number of states of said fetch cycle and an incorporated peripheral bus state counter for counting the number of states of said incorporated peripheral bus cycle, and said bus controller which starts in parallel both an instruction fetch cycle of said external memory based on a result of a count of said external bus state counter and a data access cycle of said input/output operation based on a result of a count of said incorporated peripheral bus state counter, wherein said incorporated peripheral bus, said central processing unit, said first data path means, said second data path means, said bus controller and said input/output circuit are formed in a same chip, and said external bus and said external memory formed outside said chip.

* * * * *